United States Patent [19]

Iacoviello et al.

[11] Patent Number: 4,767,816

[45] Date of Patent: Aug. 30, 1988

[54] POLYVINYL ALCOHOL-STABILIZED VINYL CHLORIDE-ETHYLENE-HYDROXYETHYL ACRYLATE COPOLYMER EMULSIONS HAVING ENHANCED WATER AND SOLVENT RESISTANT PROPERTIES

[75] Inventors: John G. Iacoviello; William J. Hook, both of Allentown; Bheema R. Vijayendran, Emmaus, all of Pa.

[73] Assignee: Air Products and Chemicals, Inc., Allentown, Pa.

[21] Appl. No.: 65,796

[22] Filed: Jun. 24, 1987

[51] Int. Cl.$^4$ ............................ C08F 2/16; C08K 3/20
[52] U.S. Cl. .................................. 524/459; 524/548; 524/503; 526/202
[58] Field of Search ............... 524/458, 503, 459; 526/202

[56] References Cited

U.S. PATENT DOCUMENTS

| | | | |
|---|---|---|---|
| 3,501,440 | 3/1970 | Kamio et al. | 260/77.5 |
| 3,642,740 | 2/1972 | Pierce et al. | 260/87.5 |
| 3,689,447 | 9/1972 | Makaver et al. | 260/29.6 |
| 3,875,130 | 4/1975 | Kemp | 260/87.1 |
| 3,895,167 | 7/1975 | Gor | 427/388 |
| 4,133,791 | 1/1979 | Kemenster et al. | 260/29.6 |
| 4,150,210 | 4/1979 | Anderson et al. | 526/222 |
| 4,189,415 | 2/1980 | Eck et al. | 260/29.6 |
| 4,287,329 | 9/1981 | Heimberg | 524/459 |
| 4,331,577 | 5/1982 | Hanna | 524/819 |
| 4,521,561 | 6/1985 | Hausman et al. | 524/459 |
| 4,528,315 | 7/1985 | Eck et al. | 524/458 |
| 4,673,702 | 6/1987 | Iacoviello | 524/459 |

FOREIGN PATENT DOCUMENTS

| | | | |
|---|---|---|---|
| 0075486 | 10/1973 | Japan | 524/459 |
| 0128988 | 12/1974 | Japan | 524/459 |
| 0159202 | 12/1981 | Japan | 524/459 |
| 0212211 | 12/1982 | Japan | 524/459 |
| 0080311 | 5/1983 | Japan | 524/459 |

*Primary Examiner*—Joseph L. Schofer
*Assistant Examiner*—J. M. Reddick
*Attorney, Agent, or Firm*—Michael Leach; William F. Marsh; James C. Simmons

[57] ABSTRACT

An aqueous copolymer emulsion comprising a copolymer consisting essentially of vinyl chloride, ethylene and up to 10 wt % hydroxyalkyl (meth)acrylate colloidally dispersed in an aqueous medium. The copolymer demonstrates improved solvent resistance and metal adhesion, especially to low energy films.

12 Claims, No Drawings

POLYVINYL ALCOHOL-STABILIZED VINYL CHLORIDE-ETHYLENE-HYDROXYETHYL ACRYLATE COPOLYMER EMULSIONS HAVING ENHANCED WATER AND SOLVENT RESISTANT PROPERTIES

TECHNICAL FIELD

The present invention relates to vinyl chloride-ethylene copolymer emulsions and, more particularly, to polyvinyl alcohol-stabilized vinyl chloride-ethylene copolymer emulsions.

BACKGROUND OF THE INVENTION

It is known that vinyl chloride-ethylene copolymers prepared using polyvinyl alcohol as the stabilizing agent according to European Pat. Publication No. 0 150 059 published 31 July 1985 demonstrate better water resistance than would be expected for such a polyvinyl alcohol-containing emulsion copolymer. However, vinyl chloride polymers characteristically have poor solvent resistance.

U.S. Pat. No. 3,501,440 discloses in Example 5 and reference Examples 5-6 the use of polyvinyl alcohol as the suspension agent in the copolymerization of ethylene with vinyl chloride.

U.S. Pat. No. 3,642,740 discloses that vinyl chloride homo- and copolymers can be prepared in an aqueous emulsion using as the emulsifier system an alkali metal salt of a sulfated $C_8$–$C_{18}$ fatty alcohol, a tallow fatty alcohol or an epoxidized unsaturated fatty acid oil, and a complex organic phosphate ester or salt derivative.

U.S. Pat. No. 3,689,447 discloses that heat resistant copolymers of ethylene and vinyl chloride can be prepared by the use of a seed latex in the aqueous composition for emulsion polymerization, together with heat-activated initiation of between 50° and 85° C. by water-soluble persulfates or peroxydiphosphates.

U.S. Pat. No. 3,875,130 discloses the preparation of homo- and copolymers of vinyl chloride in which the polymerization of the monomer composition is carried out in the presence of a seeding product prepared by the polymerization in emulsion or fine suspension.

U.S. Pat. No. 3,895,167 discloses a metal coating composition comprising a vinyl chloride-ethylene copolymer and a heat curable, thermal setting aminoplast resin mixture of a methylolated ethyleneurea resin and an alkylated triazine/formaldehyde condensate.

U.S. Pat. No. 4,133,791 discloses the preparation of an aqueous ethylene-containing copolymer dispersion by polymerizing an aqueous monomer mixture of ethylene and at least one monomer copolymerizable with ethylene under conventional ethylene copolymerization conditions in the presence of from 1 to 15 wt % of 70 to 100% hydrolyzed polyvinyl alcohol.

U.S. Pat. No. 4,150,210 discloses a one-step process for the emulsion polymerization of vinyl chloride and, optionally, comonomers using a watersoluble initiator or initiator system and a mixed emulsifier system.

U.S. Pat. No. 4,189,415 discloses aqueous vinyl chloride-vinyl acetate-ethylene copolymer dispersions containing only polyvinyl alcohol as the protective colloid. All the polyvinyl alcohol or only part of it can be introduced at the beginning, the ethylene pressure applied is kept constant and the polymerization temperature is 10°–85° C., preferably 20°–50° C.

U.S. Pat. No. 4,331,577 discloses a method for preparing ethylene-containing copolymer emulsions by the selective addition of the monomers mixture to the reactor in response to pressure variation and the maintenance of a monomer on saturation condition in the reactor.

U.S. Pat. No. 4,528,315 discloses a process for the preparation of aqueous polymer emulsions of vinyl halides and/or vinyl esters and additional monomers in the absence of emulsifying agents. Example 9 shows a vinyl chloride-vinyl acetate-ethylene copolymer also containing hydroxypropyl acrylate, acrylamide and acrylic acid.

SUMMARY OF THE INVENTION

The present invention provides stable polyvinyl alcohol/vinyl chloride-ethylene copolymer emulsions which can deposit a polyvinyl chloride-containing polymeric coating that demonstrates surprisingly enhanced solvent resistance and adhesion to low energy films. This improved solvent resistance and adhesion is achieved by incorporating up to about 10% of a $C_2$–$C_4$ hydroxyalkyl acrylate into the copolymer.

The stable copolymer emulsion comprises from 20 to 70 wt %, especially about 40 to 60 wt %, of a copolymer colloidally dispersed in an aqueous medium, the copolymer comprising about 65 to 90 wt % vinyl chloride, about 5 to 35 wt % ethylene, and less than about 10 wt % hydroxyalkyl (meth)acrylate and having a Tg from about 0° to 40° C. The copolymer is prepared by aqueous emulsion polymerization in the presence of about 3 to 15 wt % polyvinyl alcohol which is 70 to 91 mole % hydrolyzed as the dispersing, or emulsifying, agent. The wt % values are based on vinyl chloride monomer.

As another embodiment of the invention there is provided coating compositions containing such emulsions and crosslinking agents or resins which can be deposited on metal or wood substrates, especially metal containers.

The emulsions of the invention can also be used as a saturant for the preparation of filter stock having improved hot oil resistance and good stiffness with suitable flexibility.

Thus the invention provides polyvinyl alcohol-stabilized vinyl chloride-ethylene emulsion copolymers which are water resistant, have better solvent resistance and good adhesion to aluminum and low energy films such as low density polyethylene (LDPE). The emulsions can also be blended with aminoplasts to further improve properties.

DETAILED DESCRIPTION OF THE INVENTION

The vinyl chloride-ethylene copolymers of the stable emulsions according to the invention contain about 65 to 90 wt % vinyl chloride, preferably about 75 to 80 wt %. The copolymerization reaction is performed under an ethylene pressure which is sufficient to provide the copolymer with about 5 to 35 wt % ethylene content, preferably about 20 to 25 wt %. Pressures of about 50 to 100 atm are generally used to afford such ethylene content.

Most importantly, the vinyl chloride-ethylene copolymers contain up to about 10 wt %, preferably about 2 to 80 wt %, of a $C_2$–$C_4$ hydroxyalkyl acrylate or hydroxyalkyl methacrylate. The $C_2$–$C_4$ hydroxyalkyl group may be hydroxypropyl, hydroxybutyl or the preferred hydroxyethyl. The term "hydroxyalkyl (meth)acrylate" means hydroxyalkyl acrylate and/or hydroxyalkyl methacrylate.

The dispersing agent, or protective colloid, used in preparing the emulsions is at least one polyvinyl alcohol. A single polyvinyl alcohol may be used alone or mixtures of different polyvinyl alcohols can be used.

The amount of polyvinyl alcohol used in the polymerization reaction is about 3 to 15 wt %, preferably 4 to 10 wt %, based on monomers, substantially all of which is added initially to the aqueous medium, i.e. prior to initiation of polymerization. Additional amounts of polyvinyl alcohol can be added to the reaction mixture during polymerization provided that at least about 3 wt %, preferably at least about 4 wt %, polyvinyl alcohol is present in the reaction mixture upon initiation.

The polyvinyl alcohols which are suitable for use in the invention are, in general, 70 to 91 mole % hydrolyzed, preferably 87 to 89 mole % hydrolyzed, and have a degree of polymerization (DPn) ranging from 200 to 4000, preferably 500 to 2500. A polyvinyl alcohol having a DPn at the lower end of the range, e.g. from 200 to about 400, should be used in combination with a polyvinyl alcohol having a higher DPn of about 500 or more.

Other protective colloids, such as celluloses or hydroxyalkyl celluloses, or typical emulsifying agents such as nonionic or ionic surfactants in combination with the polyvinyl alcohol may be used in amounts no greater than about equal proportions, based on weight of polyvinyl alcohol, although water resistance may be impaired.

Free radical sources, for example redox systems, used in the practice of this invention are conventional and used in conventional amounts. The polymerization is generally performed with quantities of redox system ranging from 0.03 to 3 wt % based on monomers. Typically, the entire quantity of either the oxidant or reductant component of the redox system, or a substantial proportion, is introduced at the beginning and polymerization is initiated and controlled by metering in the other component. Obviously, the polymerization may be controlled by the simultaneous metering in of both components. Examples of the oxidizing component are ammonium persulfate, potassium persulfate, hydrogen peroxide and t-butylhydroperoxide. Examples of the reducing component are sodium sulfite, sodium metabisulfite, zinc or sodium formaldehyde sulfoxylate and ascorbic acid and its enantiomer erythorbic acid. The preferred redox system comprises hydrogen peroxide and ascorbic or erythorbic acid.

The oxidizing agent is generally employed in an amount from about 0.01 to 1%, preferably 0.05 to 0.5%, based on weight of monomers introduced into the polymerization system. The reductant is ordinarily added in an aqueous solution in the necessary equivalent amount. It is important that a reductant be present in the polymerization recipe because the oxidant, in most cases, does not furnish free radicals rapidly enough at temperatures below about 80° C. to expeditiously effect polymerization of the monomers.

The polymerization process comprises:

(a) forming an aqueous emulsion reaction mixture containing substantially all the polyvinyl alcohol and a portion, preferably at least about 15%, of the total vinyl chloride monomer, (b) pressurizing the reaction mixture with an ethylene pressure sufficient to provide the copolymer with about 5 to 35 wt % ethylene content, (c) initiating the reaction mixture by the addition of a free radical forming source and continuing polymerization until the rate of polymerization begins to decrease, (d) adding the remaining vinyl chloride, preferably at the substantially uniform rate over a period of time, while continuing polymerization until the reaction is no longer self-sustaining, and (e) removing the unreacted ethylene and reducing the vinyl chloride free monomer content, preferably to less than 10 ppm.

Such process for the emulsion polymerization of polyvinyl alcohol-stabilized vinyl chloride-ethylene copolymer emulsions is described in more detail in application Ser. No. 747,133 filed 20 June 1985, now U.S. Pat. No. 4,673,702, which disclosure is hereby incorporated by reference.

The hydroxyalkyl (meth)acrylate is preferably added to the polymerization reaction incrementally as a delay. By "delay" addition is meant the addition of a component in a continuous or intermittent and, preferably, a substantially uniform rate. The hydroxyalkyl acrylate could be delayed throughout the total reaction including the initial prepolymer preparation or delayed at various times during the final stages of the polymerization. However, the preferred method is to delay the hydroxyalkyl acrylate into the reaction with the vinyl chloride.

The polyvinyl alcohol-stabilized vinyl chloride-ethylene-hydroxyalkyl acrylate copolymer emulsions may be used to prepare container coating, heat seal coating and lamination adhesive compositions which, when applied to a metal substrate and cured, provide a polymer coating possessing surprisingly enhanced solvent resistance and adhesion as well as good water resistance. Such coating compositions generally involve admixing the copolymer emulsions with crosslinking resins, coalescing agents and acid components all well known in the metal container coating art such as aminoplasts, epoxy resins, dialdehydes, amines, diols, acid catalysts and organic co-solvents. A general can coating composition would comprise (a) about 45 to 95 wt % copolymer emulsion, (b) about 5 to 40 wt % crosslinking resin, based on solids, (c) up to 10 wt % organic cosolvent (coalescing agent) and, optionally, (d) up to 5 wt % acid catalyst. These compositions are then applied to metal substrates such as steel or aluminum by spraying, dipping, roll coating or other application methods well known in the can coating art and cured by heating.

The polyvinyl alcohol stabilized vinyl chloride-ethylene-hydroxyalkyl acrylate copolymer emulsions may also be used to prepare lamination adhesive coating compositions that show excellent heat seal bond in an aluminum foil-low density polyethylene (LDPE) film-laminate. Typically, 1-3 pounds per ream coat weight of the emulsion (compounded with suitable cosolvents, blocking agents, crosslinkers, etc.) is applied to the metal foil surface and baked at 300°-350° F. for 1-10 seconds. The coated foil is heat sealed to a LDPE film in a Sentinel Heat sealer at 40 psi, 200°-250° F. for 0.5-1 seconds. Bond strengths greater than 1.5 pli are obtained. Under similar test conditions, vinyl chloride-ethylene copolymer without the hydroxyalkyl acrylate functionality give bond values that are less than 1 pli.

The polyvinyl alcohol stabilized vinyl chloride-ethylene-hydroxyalkyl acrylate copolymer emulsions may also be used as a saturant binder for filter stock substrates. The cellulosic based filter media is typically saturated with the emulsion (20-30% add-on) and the treated stock is baked at 250°-350° F. for 5-10 minutes to promote film coalescence and distribution of the binder in the filter matrix. Optionally, the latex can be crosslinked with melamine-formaldehyde, phenol formaldehyde, urea-formaldehyde, or reactive polymeric isocyanates to enhance the strength and other mechanical properties of the treated filter. Filter stocks treated with the hydroxyalkyl-containing vinyl chloride-ethylene copolymer emulsions give improved resistance to hot motor oil (300° F.) and boiling water. Nonfunctional vinyl chloride-ethylene copolymer emulsion analogs give poorer hot oil resistance properties.

EXAMPLE 1

The following ingredients were added to a one gallon pressure reactor:

| Deionized H$_2$O | 400 g |
|---|---|
| Ferric ammonium sulfate (5% soln) | 10 g |
| Sequestrine 30A | 2.7 g |
| Vinol ® 205 PVOH (12% soln.) | 1.23 g |

The reactor contents were purged three times with 25 psig ethylene while stirring at 200 rpm. The following ingredients were then added:

| Vinyl chloride | 240 g |
|---|---|
| Erythorbic acid (10% soln) | 28.5 ml |

The agitation was increased to 1100 rpm and the reactor contents were heated to 52° C. while pressurizing to 900 psig ethylene. When the temperature and pressure had equilibrated, the polymerization was initiated with 2% aqueous hydrogen peroxide solution. Upon initiation, a 10 % erythorbic acid solution was also started. The oxidizing and reducing agent solutions were added until essentially all the vinyl chloride in the initial charge was polymerized. This was observed when the reactor jacket temperature approached the temperature of the reaction medium. Approximately 0.64 g hydrogen peroxide and 2.85 g erythorbic acid were consumed. At this point 1415 g vinyl chloride monomer was added over a 4 hour period along with 292 g of a 25% solution of hydroxyethyl acrylate (HEA) as a separate delay. Over this period 2.7 g hydrogen peroxide and 9.7 g erythorbic acid were used. The polymerization was continued for an additional 0.5 hour when the jacket temperature met the reaction temperature and the polymerization was essentially complete. A total of 3.06 g hydrogen peroxide and 9.7 g erythorbic acid were consumed.

The reactor contents were transferred to a degasser and the emulsion was treated under vacuum with 38 Bg vinyl acetate and 100 g of a 5% solution of t-butylhydroperoxide and 5 g of a 10% of erythorbic acid. The emulsion copolymer had a Tg of +27° C. and the emulsion was 52% solids. The final pH of the emulsion (Run 1) was adjusted to 5-6 with ammonium hydroxide.

Following this procedure emulsion Runs 2-4 containing various levels of hydroxyethyl or hydroxypropyl acrylate were prepared as shown in the Table. Run 5 was an emulsion of a corresponding polyvinyl alcohol-stabilized vinyl chloride-ethylene copolymer not containing a third comonomer.

The various polyvinyl alcohol stabilized vinyl chloride-ethylene copolymer emulsions were compared in a melamine-formaldehyde crosslinking resin formulation. The formulation comprised the following in parts by weight solids:

| Vinyl chloride-ethylene emulsion copolymer | 100 |
|---|---|
| Cymel 303 melamine formaldehyde | 10 |
| Epon 828 low molecular weight epoxy | 10 |
| Organic acid catalyst | 0.4 |

The PVOH-stabilized vinyl chloride-ethylene copolymer emulsions were applied to the metal substrate, preferably aluminum of 0.1-0.15 inch thickness. The coating thickness was from 7 to 10 microns dry. The coating was applied with a wire wound drawdown bar and baked in an oven for 3-5 minutes at 350°-390° F. The coated panel was cooled and the coating was evaluated as follows:

Solvent resistance - A cotton swab was saturated with an organic solvent, namely methylethyl ketone and vigorously rubbed over the coating. Failure was noted when the solvent began to dissolve the coating.

TABLE

| RUN | HEA | HPA | Tg | % Solids | Gel Fraction | Solvent Resistance (MEK Double Rubs) |
|---|---|---|---|---|---|---|
| 1 | 4 | — | 27 | 52 | 45 | 45 |
| 2 | 2.5 | — | 29.5 | — | — | 30 |
| 3 | 8 | — | 25 | — | 75 | 70 |
| 4 | — | 4 | — | — | — | 45 |
| 5 | — | — | — | — | 24 | 10 |

HEA—hydroxyethyl acrylate
HPA—hydroxypropyl acrylate

It can be seen that the hydroxyethyl and hydroxypropyl acrylate modified copolymers compared very favorably in solvent resistance testing The type of crosslinking resins selected will have an effect on the final solvent resistance. Cymel 303, Cymel 325 and Cymel 370 are examples of melamine-formaldehyde resins with varying degrees of methylolation.

Gel fraction testing is another test methodology used as a quantitative assessment of crosslink density. Uncoated aluminum screens were dip coated with the above melamine-formaldehyde crosslinking resin formulations containing the polyvinyl alcohol-stabilized vinyl chloride-ethylene (PVOH/EVCl) copolymers. The formulations were diluted to 42.5 wt % solids with water.

The weight of formulation applied to the screens and the screen section is important to the test precision. A 1×3 inch screen section was formed into a cylinder. The coating was flash dried with a hot air gun and baked in an oven for 4 min at 350° F. (176° C.). The screens were allowed to cool and the coating weight determined. The screens were then placed in 100° C. dimethyl formamide (DMF) for 16 hours and a mild agitation. The screens were then removed and cooled to a constant weight. The percent gel fraction was determined as follows:

Gel Fraction =

$$\frac{\text{Wt of Screen with Coating after } DMF \text{ Exposure} - \text{Wt of Screen}}{\text{Wt of Screen with Dried Coating} - \text{Wt of Screen}}$$

Polyvinyl alcohol-stabilized vinyl chloride-ethylene copolymers exhibited 20-40% gel fraction while the incorporation of hydroxyalkyl acrylate at levels of 2 to 8 wt % increased the gel fraction to 65 to 80%.

STATEMENT OF INDUSTRIAL APPLICATION

The invention provides polyvinyl alcohol-stabilized vinyl chloride-ethylene-hydroxyalkyl acrylate emulsion copolymers having improved solvent resistance and adhesion properties and useful in metal coating formulations and filter paper stock.

We claim:

1. In an aqueous polyvinyl alcohol-stabilized vinyl chloride-ethylene copolymer emulsion, the improvement which comprises the copolymer also containing up to 10 wt % of a $C_2$-$C_4$ hydroxyalkyl (meth)acrylate, based on vinyl chloride.

2. The copolymer emulsion of claim 1 in which the copolymer is 2-8 wt % hydroxyalkyl (meth)acrylate.

3. The copolymer emulsion of claim 1 in which the copolymer is up to 10 wt % hydroxyethyl acrylate.

4. The copolymer emulsion of claim 1 in which the copolymer is up to 10 wt % hydroxypropyl acrylate.

5. A copolymer emulsion comprising an aqueous colloidal dispersion of 20-70% solids of a copolymer prepared by the emulsion polymerization of a monomer mixture consisting essentially of 65-90 wt % vinyl chloride, 5-35 wt % ethylene, and up to 10 wt % $C_2$-$C_4$ hydroxyalkyl (meth)acrylate in the presence of a stabilizing system consisting essentially of 3 to 15 wt % polyvinyl alcohol which is 70 to 91 mole % hydrolyzed.

6. The copolymer emulsion of claim 5 in which the copolymer is 75-80 wt % vinyl chloride.

7. The copolymer emulsion of claim 5 in which the copolymer is 2-8 wt % hydroxyalkyl (meth)acrylate.

8. The copolymer emulsion of claim 5 in which the copolymer is 2-8 wt % hydroxyethyl acrylate.

9. The copolymer emulsion of claim 5 in which the copolymer is 2-8 wt % hydroxypropyl acrylate.

10. A copolymer emulsion comprising an aqueous colloidal dispersion of 40-60% solids copolymer prepared by the emulsion polymerization of a monomer mixture consisting essentially of 65-90 wt % vinyl chloride, 5-35 wt % ethylene, and up to 10 wt % hydroxyethyl acrylate in the presence of a stabilizing system consisting essentially of 3 to 15 wt % polyvinyl alcohol which is 70 to 91 mole % hydrolyzed.

11. The copolymer emulsion of claim 10 in which the copolymer is 75-80 wt % vinyl chloride.

12. The copolymer emulsion of claim 10 in which the copolymer is 2-8 wt % hydroxyethyl acrylate.

* * * * *